US011282179B2

(12) United States Patent
Vu et al.

(10) Patent No.: US 11,282,179 B2
(45) Date of Patent: Mar. 22, 2022

(54) SYSTEM AND METHOD FOR MACHINE LEARNING BASED VIDEO QUALITY ASSESSMENT

(71) Applicant: VMware, Inc., Palo Alto, CA (US)

(72) Inventors: Lan Vu, San Jose, CA (US); Hari Sivaraman, Livermore, CA (US); Uday Pundalik Kurkure, Los Altos, CA (US); Xuwen Yu, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 38 days.

(21) Appl. No.: 16/823,162

(22) Filed: Mar. 18, 2020

(65) Prior Publication Data

US 2021/0295493 A1 Sep. 23, 2021

(51) Int. Cl.
*G06T 7/00* (2017.01)
*G06K 9/00* (2022.01)
*G06K 9/62* (2022.01)
*H04L 65/80* (2022.01)
*G06N 3/08* (2006.01)

(52) U.S. Cl.
CPC ........ *G06T 7/0002* (2013.01); *G06K 9/00718* (2013.01); *G06K 9/00744* (2013.01); *G06K 9/6256* (2013.01); *G06N 3/08* (2013.01); *H04L 65/80* (2013.01)

(58) Field of Classification Search
None
See application file for complete search history.

(56) References Cited

U.S. PATENT DOCUMENTS

| 2018/0121733 A1* | 5/2018 | Joshi ................. G06K 9/00744 |
| 2019/0037270 A1 | 1/2019 | Arpirez Vega et al. |
| 2020/0169736 A1* | 5/2020 | Petajan ............ H04N 21/44008 |
| 2020/0349682 A1 | 11/2020 | Mayol Cuevas et al. |

OTHER PUBLICATIONS

Cisco, "Cisco Visual Networking Index: Forecast and Trends, 2017-2022 White Paper", 2018, 38 pgs.
VMW Discussion, "Horizon View clients have text blurring or "artifacting"", https://communities.vmware.com/thread/564979; 2017, 2 pgs.
VMW Discussion, "Blast Sharpness/Bluriness", https://communities.vmware.com/thread/595074; 2018, 3 pgs.
Wang, Zhou, "Image Quality Assessment: From Error Visibility to Structural Similarity", in IEEE Transactions on Image Processing, vol. 13 , Issue: 4 , Apr. 2004, 14 pages.
Sara, Umme et al, "Quality Assessment through FSIM, SSIM, MSE and PSNR—A Comparative Study"; Journal of Computer and Communications, 2019, 7, 8-18, 11 pages.
Shorten, Connor et al. "A survey on Image Data Augmentation for Deep Learning", in Journal of Big Data, Jul. 6, 2019, 48 pages.
Pandey, Atul et al. "An Automation Framework for Benchmarking and Optimizing Performance of Remote Desktops in the Cloud", in Proc. of the 2017 IEEE Int. Conf. on High Performance Computing & Simulation; 8 pages.

* cited by examiner

*Primary Examiner* — Leon Flores
(74) *Attorney, Agent, or Firm* — Loza & Loza, LLP

(57) ABSTRACT

A system and method for assessing video quality of a video-based application inserts frame identifiers (IDs) into video content from the video-based application and recognizes the frame IDs from the video content using a text recognition neural network. Based on recognized frame IDs, a frame per second (FPS) metric of the video content is calculated. Based on the FPS metric of the video content, objective video quality of the video-based application is assessed.

20 Claims, 17 Drawing Sheets

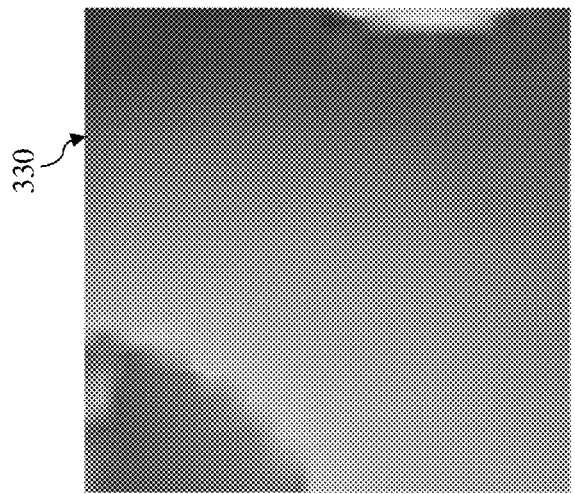
FIG. 3C Bad
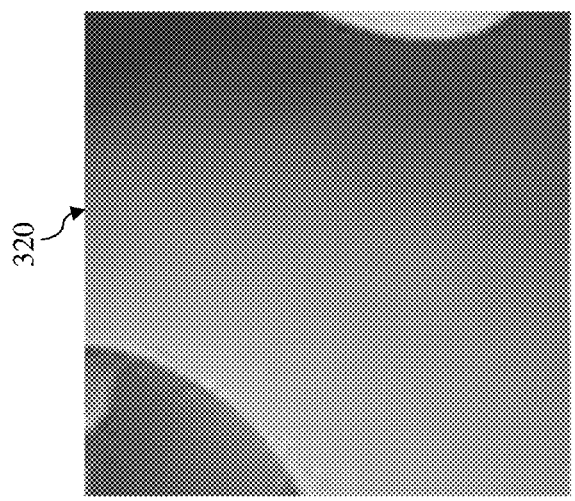
FIG. 3B Average
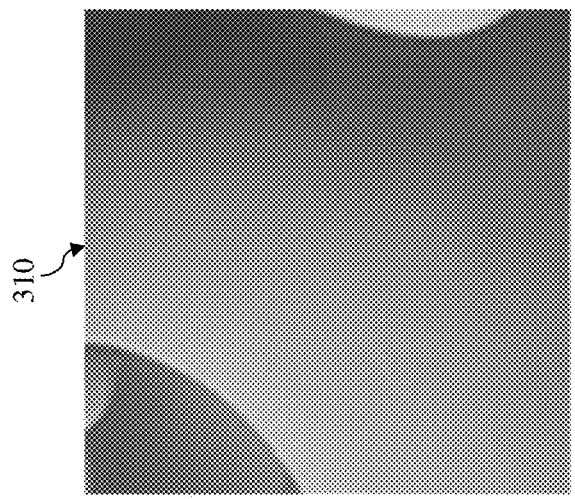
FIG. 3A Good

Good

Bad

Bad

SYSTEM AND METHOD FOR MACHINE LEARNING BASED VIDEO QUALITY ASSESSMENT

BACKGROUND

Video-based applications, such as video streaming applications, are important workloads in a cloud environment. For example, video-based content can account for 80%-90% of Internet traffic. Video-based applications can be hosted and executed inside datacenters or clouds (e.g., VMware based datacenters or clouds) and are demanding workloads in term of computing, storage and networking resources requirements. For example, VMware Horizon® product can be used for the management and delivery of virtual desktops and applications, including video streaming applications, such as YouTube, Zoom and Skype applications, running inside cloud-based remote desktops to end-users.

Quality of video-based applications, such as video streaming applications, heavily depends on the network condition and cloud resource capacity. Optimizing cloud resources for video-based applications can reduce costs of operating datacenters. At the same time, end-users usually require high quality of video streaming content, which makes optimization of cloud resources for video-based applications a challenge. On one hand, cloud providers want to monitor video-based applications to know if they can optimize application deployment for cost saving while maintaining best user experiences. On the other hand, cloud software developers want to know at what conditions the end-users will suffer from bad quality of video-based applications such that they can optimize or provide new application features to enhance user experiences.

Current video quality assessment methods use inflexible metrics to quantify video quality. However, these metrics may not be able to accurately reflect video quality. Therefore, there is a need to accurately quantify and monitor video quality such that quality of video-based applications can be maintained while cloud resource usage is optimized.

SUMMARY

A system and method for assessing video quality of a video-based application inserts frame identifiers (IDs) into video content from the video-based application and recognizes the frame IDs from the video content using a text recognition neural network. Based on recognized frame IDs, a frame per second (FPS) metric of the video content is calculated. Based on the FPS metric of the video content, objective video quality of the video-based application is assessed.

A computer-implemented method for assessing video quality of a video-based application in accordance with an embodiment of the invention comprises inserting frame IDs into video content from the video-based application, recognizing the frame IDs from the video content using a text recognition neural network, calculating a FPS metric of the video content based on recognized frame IDs and assessing objective video quality of the video-based application based on the FPS metric of the video content. In some embodiments, the steps of this method are performed when program instructions contained in a non-transitory computer-readable storage medium are executed by one or more processors.

A system for assessing video quality of a video-based application in accordance with an embodiment of the invention comprises memory and at least one processor configured to insert frame IDs into video content from the video-based application, recognize the frame IDs from the video content using a text recognition neural network, calculate a FPS metric of the video content based on recognized frame IDs and assess objective video quality of the video-based application based on the FPS metric of the video content.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 3A-3C depict three video images of the same scene having different video qualities.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
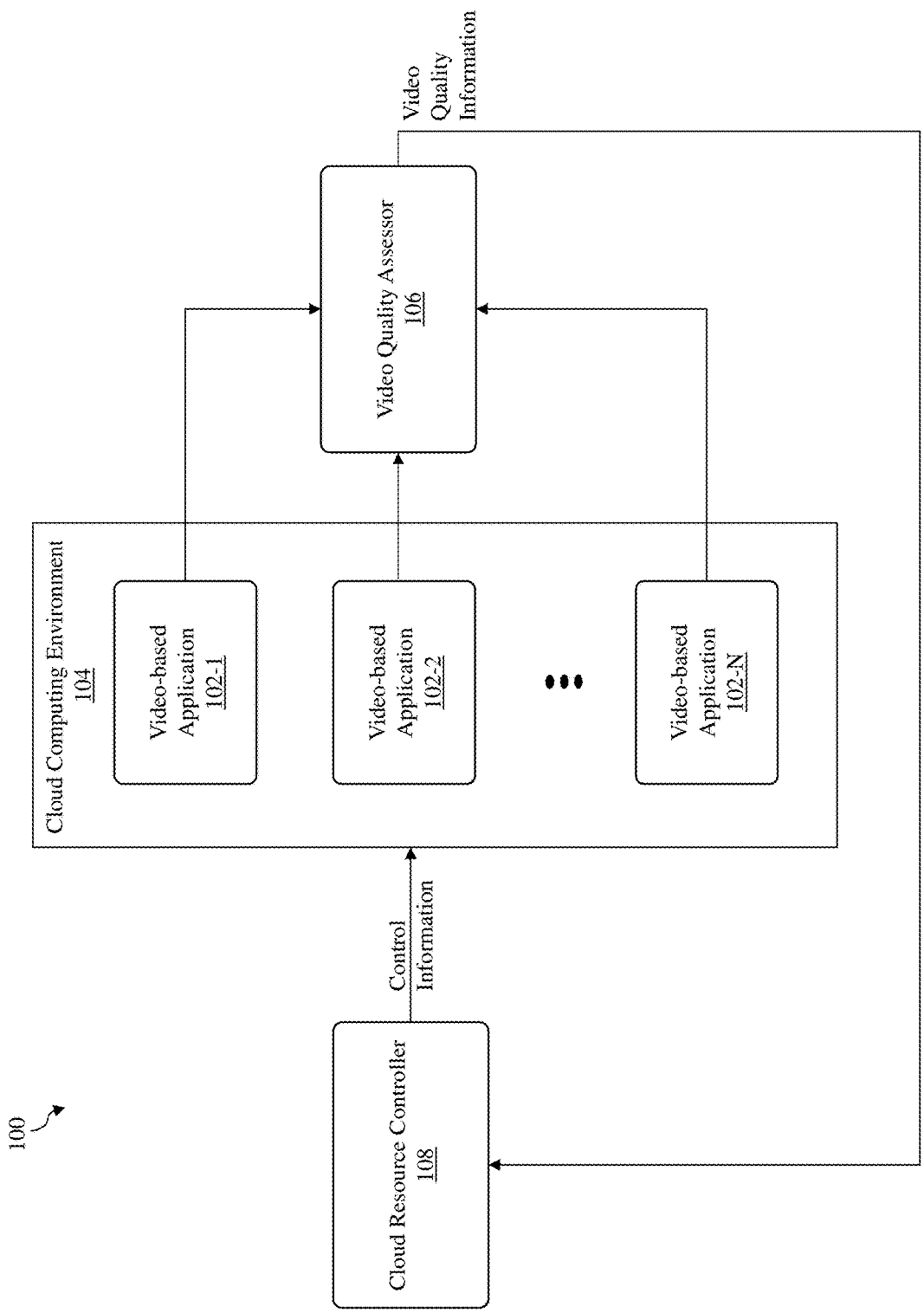
FIG. 1 is a block diagram of a video application system in accordance with an embodiment of the invention.

FIG. 1 shows a video application system 100 in accordance with an embodiment of the invention. The video application system 100 includes one or more video-based applications 102-1, 102-2, . . . , 102-N, where N is a positive integer, at least one video quality assessor 106, and at least one cloud resource controller 108. As used herein, the term "video-based application" refers to any software application that can run on a computer system to handle and/or transmit video content. In some embodiments, at least one of the video-based applications 102-1, 102-2, . . . , 102-N is a video streaming application, such as YouTube, Zoom, Skype, or VMware Horizon® application that plays video content. In some embodiments, the video application system 100 is used to detect and test performance issues of VM console of VM vSphere® platform, to measure VM vSphere vMotion® stunning time and/or to measure central processing unit (CPU)/graphics processing unit (GPU) performance on VM vSphere platform on encoding/decoding video content.

In some embodiments, the video-based applications 102-1, 102-2, . . . , 102-N execute within a cloud computing environment 104, which may include one or more networks or clouds. In some embodiments, the cloud computing environment includes computing and/or storage infrastructures to support the video-based applications 102-1, 102-2, . . . , 102-N, the video quality assessor 106, and/or the cloud resource controller 108. In these embodiments, the cloud computing environment may include one or more host computer systems ("hosts"), which can be constructed on a server grade hardware platform, such as an x86 architecture platform. The hardware platform of each host may include conventional components of a computing device, such as one or more processors (e.g., central processing units (CPUs)), system memory, a network interface, storage system, and other I/O devices such as, for example, a mouse and a keyboard. Each host may be configured to provide a virtualization layer that abstracts processor, memory, storage, and networking resources of the hardware platform into virtual computing instances or software processing entities, e.g., software applications, software processes, virtual machines and software containers, which can run concurrently on the same host. For example, virtual machines may run on top of a software interface layer, which can also be referred to as a hypervisor, which enables sharing of the hardware resources of the host by the virtual machines. One example of the hypervisor that may be used in an embodiment described herein is a VMware ESXi™ hypervisor provided as part of the VMware vSphere® solution made commercially available from VMware, Inc. The hypervisor may run on top of the operating system of the host or directly on hardware components of the host. For other types of virtual appliances, the host may include other virtualization software platforms to support those virtual appliances, such as Docker virtualization platform to support software containers. In some embodiments, the cloud computing environment 104 contains virtual desktops that are provided by VMware Horizon® product. In some embodiments, the cloud computing environment 104 includes one or more local storage devices (e.g., one or more hard disks, flash memory modules, solid state disks and optical disks) and/or a storage interface to communicate with one or more network data storage systems. Example of a storage interface is a host bus adapter (HBA) that couples the host to one or more storage arrays, such as a storage area network (SAN) or a network-attached storage (NAS), as well as other network data storage systems.

In some embodiments, the cloud computing environment 104 is a multi-cloud environment or a hybrid cloud environment that includes multiple networks or clouds. In these embodiments, the video-based applications 102-1, 102-2, . . . , 102-N are distributed in multiple networks or clouds. In an embodiment, the cloud computing environment 104 is a hybrid cloud system that includes at least one private cloud computing environment and at least one public cloud computing environment. The hybrid cloud system may be configured to provide a common platform for managing and executing commands, instructions, and/or workloads seamlessly between the private and public cloud computing environments. In one embodiment, the private cloud computing environment is controlled and administrated by a particular enterprise or business organization, while the public cloud computing environment is operated by a cloud computing service provider and exposed as a service available to account holders, such as the particular enterprise in addition to other enterprises. In some embodiments, the private cloud computing environment is a private or on-premise data center.

In some embodiments, the video quality assessor 106 is configured to assess the video quality of at least one of the video-based applications 102-1, 102-2, . . . , 102-N to generate video quality information, which can be used by the cloud resource controller 108 to optimize cloud resources for the video-based applications 102-1, 102-2, . . . , 102-N. In some embodiments, the video quality information includes subjective information regarding video quality. Examples of the subjective video quality information include, without being limited to, subjective great, subjective good, subjective average, subjective bad, and subjective terrible. In some embodiments, the video quality information includes objective information regarding video quality, such as one or more metrics related to video quality. Examples of the objective video quality metrics include, without being limited to, frame rate (e.g., frame per second (FPS)), bitrate, and packet loss rate. In some embodiments, the video quality information that is generated by the video quality assessor 106 includes both subjective information regarding video quality and objective information regarding video quality. The video quality assessor 106 may be implemented using any virtual computing instance or software processing entity that can run on a computer system, such as a software application, a software process, a VM e.g., a VM supported by virtualization products of VMware, Inc., and a software "container", e.g., a Docker container, and/or any computing system, such as a host computer system ("host"), a distributed computing system, or an embedded computing system.

In some embodiments, the cloud resource controller 108 is configured to control cloud resources, which may include computing, storage and/or networking resources, in response to the video quality information generated by the video quality assessor 106, for example, to improve video quality or maintain a particular video quality (e.g., adequate video quality suitable for video streaming) In some embodiments, based on the subjective video and/or objective quality information generated by the video quality assessor 106, the cloud resource controller 108 is configured to optimize cloud resources for the video-based applications 102-1, 102-2, . . . , 102-N to enhance user experiences or maintain high user experiences. In an embodiment, based on the video quality information generated by the video quality assessor 106, the cloud resource controller 108 improves network condition within the cloud computing environment 104 and/or increases computing and/or storage resource capacity and/or resource allocation to a particular video-based application 102-1, 102-2, . . . , or 102-N. For example, based on the video quality information of a particular video-based application 102-1, 102-2, . . . , or 102-N, the cloud resource controller 108 may increase bandwidth allocation, processing capability allocation, and/or storage allocation to a particular video-based application 102-1, 102-2, . . . , or 102-N. The cloud resource controller 108 may be implemented using any virtual computing instance or software processing entity that can run on a computer system, such as a software application, a software process, a VM e.g., a VM supported by virtualization products of VMware, Inc., and a software "container", e.g., a Docker container, and/or any computing system, such as a host computer system ("host"), a distributed computing system, or an embedded computing system.

Figure 2:
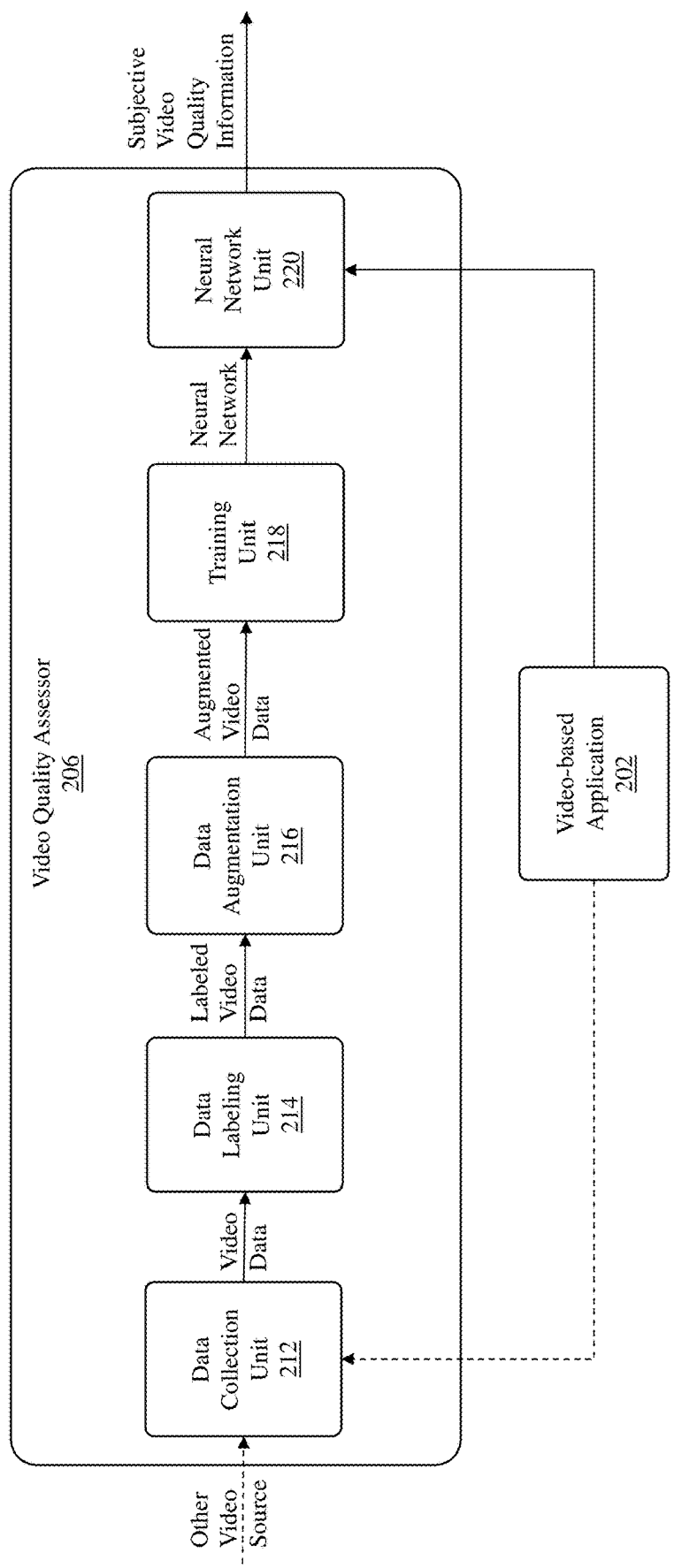
FIG. 2 depicts a video quality assessor that generates subjective video quality information of a video-based application using machine learning.

FIG. 2 depicts a video quality assessor 206 that generates subjective video quality information of a video-based application 202 using machine learning. In the embodiment depicted in FIG. 2, the video quality assessor 206 includes a data collection unit 212 that is configured to collect video data from the video-based application 202 and/or other video source (e.g., video-based application(s) or video database(s)), a data labeling unit 214 that is configured to label video data with quality level information, a data augmentation unit 216 configured to perform data augmentation to video data to enlarge video data sets, a training unit 218 configured to train at least one neutral network (e.g., at least one deep neural network) using training data of video samples, and a neutral network unit 220 that is configured to generate the subjective video quality information of the video-based application 202 using at least one neutral network (e.g., at least one deep neural network). Each of the data collection unit 212, the data labeling unit 214, the data augmentation unit 216, the training unit 218, and the neutral network unit 220 may be implemented in software, hardware, firmware, and/or a combination of software, hardware, and/or firmware. The video quality assessor 206 depicted in FIG. 2 is an embodiment of the video quality assessor 106 depicted in FIG. 1 and the video-based application 202 depicted in FIG. 2 is an embodiment of the video-based applications 102-1, 102-2, . . . , 102-N depicted in FIG. 1. However, the video quality assessor 106 and the video-based applications 102-1, 102-2, . . . , 102-N depicted in FIG. 1 are not limited to the embodiment depicted in FIG. 2.

Traditional methods for image or video quality assessment, such as Structural Similarity Index (SSIM) or Multi-scale SSIM (MS-SSIM), extract structural information of video data and use mathematics calculations to compute video quality scores. For example, SSIM uses structural similarity index functions to measure the similarity between two images and to evaluate the quality of an image compared to its original high quality one. As an example, $SSIM(x,y)=l(x,y)*c(x,y)*s(x, y)$, where $l(x,y)$ represents luminance comparison between image x and image y, $c(x,y)$ represents contrast comparison between image x and image y, and $s(x,y)$ represents structure comparison between image x and image y. MS-SSIM is an enhancement version of SSIM that allows multi-scale structural similarity measurements for comparing images of different scales. However, video quality scores that are calculated by traditional video quality assessment do not always accurately reflect actual human judgment on the video quality. FIGS. 3A-3C depict three video images 310, 320, 330 of the same scene having different video qualities. For example, a person can determine the video image 330 in FIG. 3C as being bad because video image details of the video image 330 in FIG. 3C are distorted or blurred while determine video images 310, 320 in FIGS. 3A and 3B as being good and average, respectively. However, if an SSIM based method is used, all three images 310, 320, 30 in FIGS. 3A-3C may be considered as good because of their high SSIM scores (i.e., >0.95 when compared with the original image). Therefore, a more reliable way to assess quality of video data (e.g., video streaming content) is to rely on the judgment of real users. However, this approach is costly and does not scale easily as it involves human interactions.

Rather than mathematically using structural information of video data for video quality assessment, the video quality assessor 206 depicted in FIG. 2 uses machine learning to mimic the way in which humans judge image quality for video quality assessment. In some embodiments, the video quality assessor 206 operates in two stages. In a first stage, the video quality assessor 206 builds a neural network that can categorize input video images as various quality levels (e.g., as good, average or bad), mimicking the way humans do. In a second stage, the video quality assessor 206 uses the neural network to detect and monitor the quality of the video-based application 202. Compared to traditional methods for video quality assessment, the video quality assessor 206 depicted in FIG. 2 can determine subjective video quality of video content with higher accuracy.

Figure 4:
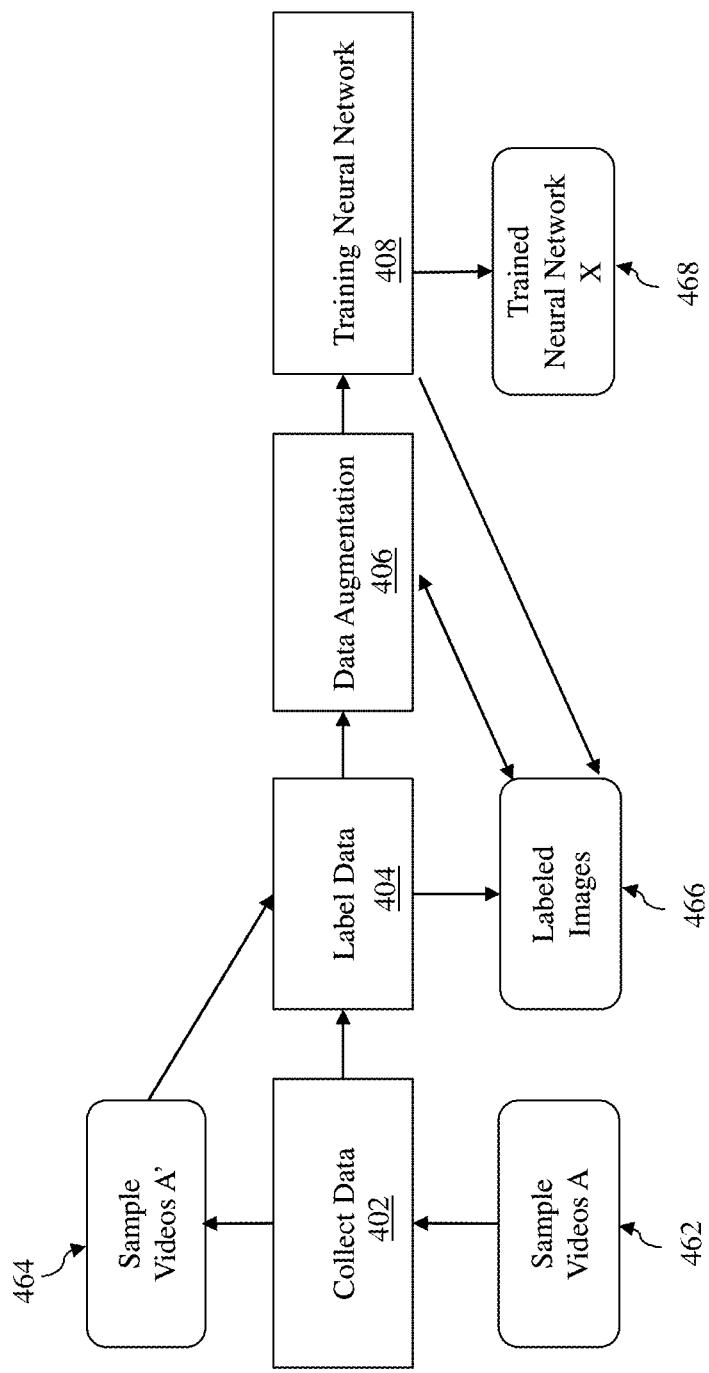
FIG. 4 is a process flow diagram of an operation for building a neural network that can be executed by the video quality assessor depicted in FIG. 2 in accordance with an embodiment of the invention.

FIG. 4 is a process flow diagram of an operation for building a neural network that can be executed by the video quality assessor 206 depicted in FIG. 2 in accordance with an embodiment of the invention. In the process flow diagram of FIG. 4, the video quality assessor 206 uses a machine learning method to learn video image patterns from training data of video samples and create or train the neural network that can recognize the quality of an input video image. For example, given the video images 310, 320, 330 as in FIGS. 3A, 3B and 3C as the input, using the trained neural network, the video quality assessor 206 may output "good" quality assessment for the video image 310 in FIG. 3A, "average" quality assessment for the video image 320 in FIG. 3B and "bad" quality assessment for the video image 330 in FIG. 3C.

Figure 5A:
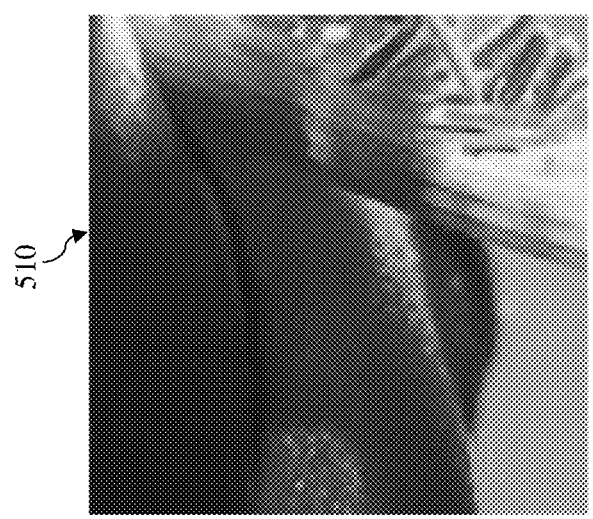
FIGS. 5A-5C depict three video images of the same scene having different video qualities.
Figure 5B:
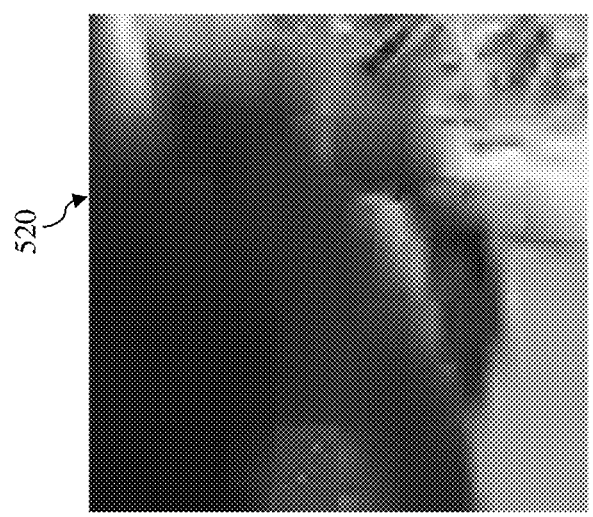
Figure 5C:
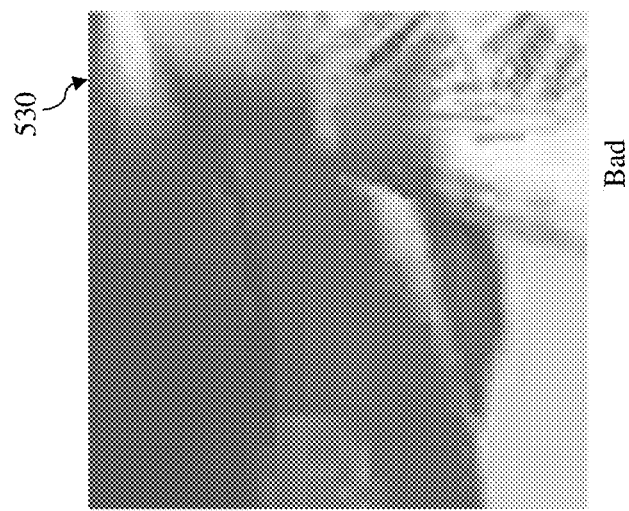

The operation in the process flow diagram of FIG. 4 begins at block 402, where video data is collected from the video-based application 202 and/or other video source (e.g., video-based application(s) or video database(s)), for example, by the data collection unit 212 depicted in FIG. 2. The characteristics of low-quality video content delivered by a video-based application (e.g., a video-streaming app) can vary. For example, one application (or app) can produce blurry video images while another app can create noisy or distorted video content and/or blurry video images. FIGS. 5A-5C depict three video images 510, 520, 530 of the same scene having different video qualities. For example, the video image 510 in FIG. 5A is of good quality while the video image 520 in FIG. 5B and the video image 530 in FIG. 5C are both of bad quality. A video-based application may produce or deliver video content with bad quality image pattern that is similar to or the same as either the video image 520 in FIG. 5B or the video image 530 in FIG. 5C. For example, in case of the worst deployment condition of a virtual desktop host platform, it may only deliver video content with the bad quality pattern similar to the image 520 in FIG. 5B, but not of the bad quality pattern similar to the image 530 in FIG. 5C. In some embodiments, video data that is used to train the neural network is directly collected from a video-based application of which the neural network is used to monitor the quality performance. In these embodiments, high accuracy in video quality assessment can be achieved or maintained.

Turning back to the process flow diagram in FIG. 4, in some embodiments, multiple sample videos with a content of interest, which are referred as sample videos A 462, are collected. Subsequently, the sample videos A 462 are played using a video streaming application whose quality is to be monitored. The played video content can be recorded at the front-end of the video streaming application as sample videos A' 464 while changing the different settings and configurations of the application deployment to match various real use cases of the video streaming application. The recorded video content includes various quality levels (e.g., good, average and low) that the video streaming application may have for various deployment conditions. Either the sample videos A 462 or the recorded sample videos A' 464 or both the sample videos A 462 and the recorded sample videos A' 464 can be labeled in a subsequent step (block 404).

Figure 6:
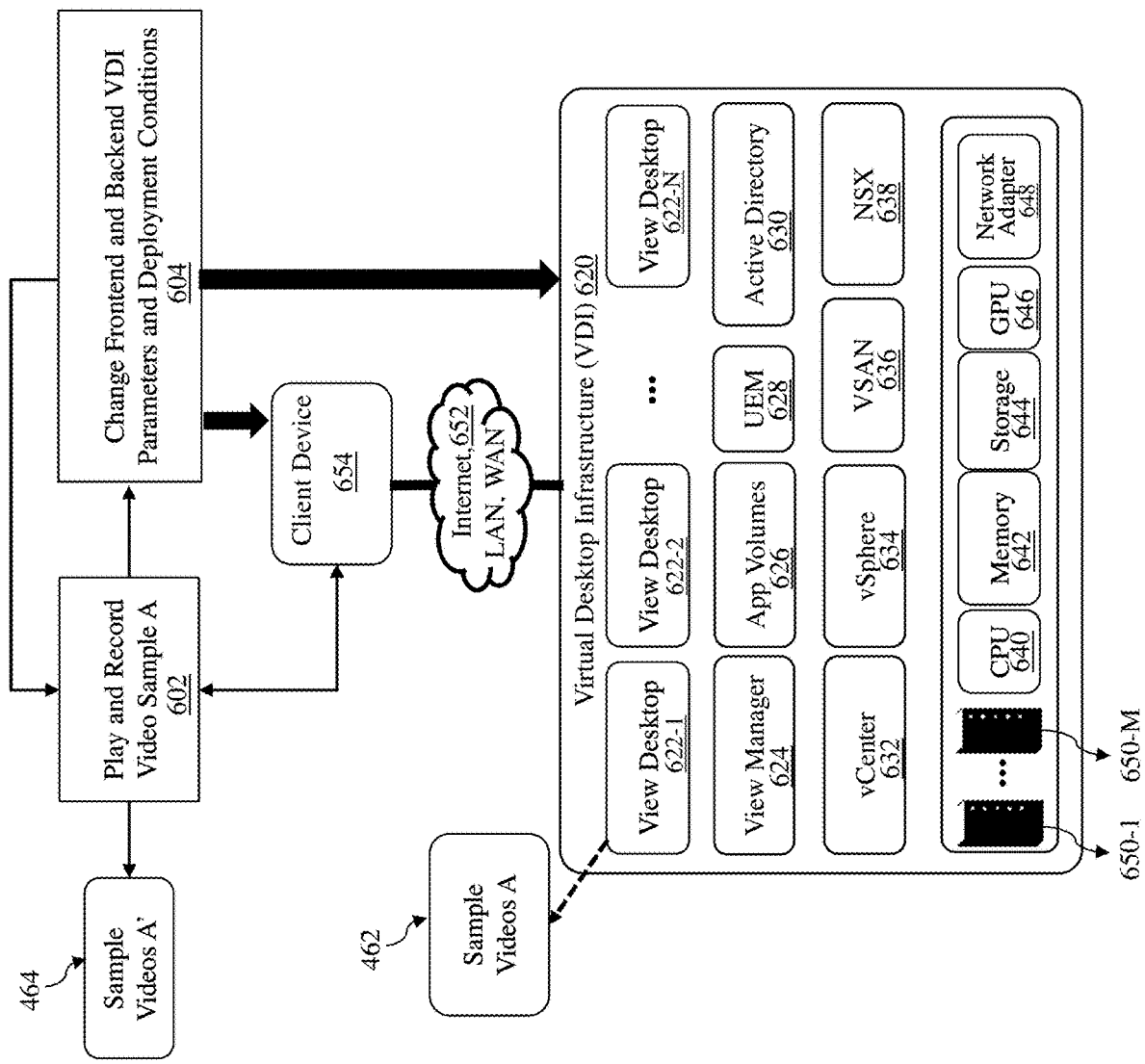
FIG. 6 depict a data collection process in a Virtual Desktop Infrastructure (VDI) in accordance with an embodiment of the invention.

FIG. 6 depict a data collection process in a Virtual Desktop Infrastructure (VDI) 620 in accordance with an embodiment of the invention. The VDI depicted in FIG. 6 may be VMware® Horizon View™ platform or other VDI. In the embodiment depicted in FIG. 6, the VDI 620 includes one or more view desktops 622-1, 622-2, ..., 622-N, where N is a positive integer, at least one view manager 624, one or more application volumes 626, at last one unified endpoint management (UEM), at least one active directory 630, at least one VMware® vCenter™ server 632, at least one VMware vSphere® product 634, at least one virtual storage area network (VSAN) 636, and at least one VMware NSX™ product 638, which are executed on top of one or more computer hosts 650-1, 650-2, ..., 650-M, where M is a positive integer. Each computer host may include at least one CPU 640, at least one memory 642, at least one storage 644, at least one GPU 646, and/or at least one network adapter 648. At block 602, sample videos A 462 are played using a video player (e.g., Windows Media player, YouTube player, etc.) in the remote view desktops 622-1, 622-2, ..., 622-N running at datacenters or clouds and video content from a client device 654 in a computing device (e.g., a personal computer (PC), a tablet or a phone) that is connected to the VDI through a network 652 (e.g., Internet, local rea network (LAN), or wide area network (WAN)) is recorded. The played video content can be recorded at the front-end of a video streaming application as the sample videos A' 464. At block 604, front-end and back-end VDI parameters and deployment conditions of the VDI 600 are changed, for example, to simulate various real use cases of a video streaming application. Some examples of deployment conditions include different settings of remote display protocol (e.g., Blast or PCoIP), with or without GPU, clients with good or bad network connections, etc.

Turning back to the process flow diagram in FIG. 4, at block 404, the recorded video content is labeled into multiple labeled video images 466, for example, by the data labeling unit 214 depicted in FIG. 2. In some embodiments, the recorded video content is extracted into frames, where each frame is an image file. In an embodiment, the extracted video frames are assessed by one or more human operators, which label each video frame with a subjective quality level (e.g., good, average or bad) based on human assessment. For example, the data labeling unit 214 may include a user interface that is used to receive human inputs on video frame quality levels.

At block 406, data augmentation is performed on the labeled video content, for example, by the data augmentation unit 216 depicted in FIG. 2. In some embodiments, the data augmentation unit 216 applies multiple data augmentation techniques to the labeled video frames to generate larger datasets. The generated data sets can be divided into training datasets and testing datasets.

Figure 7:
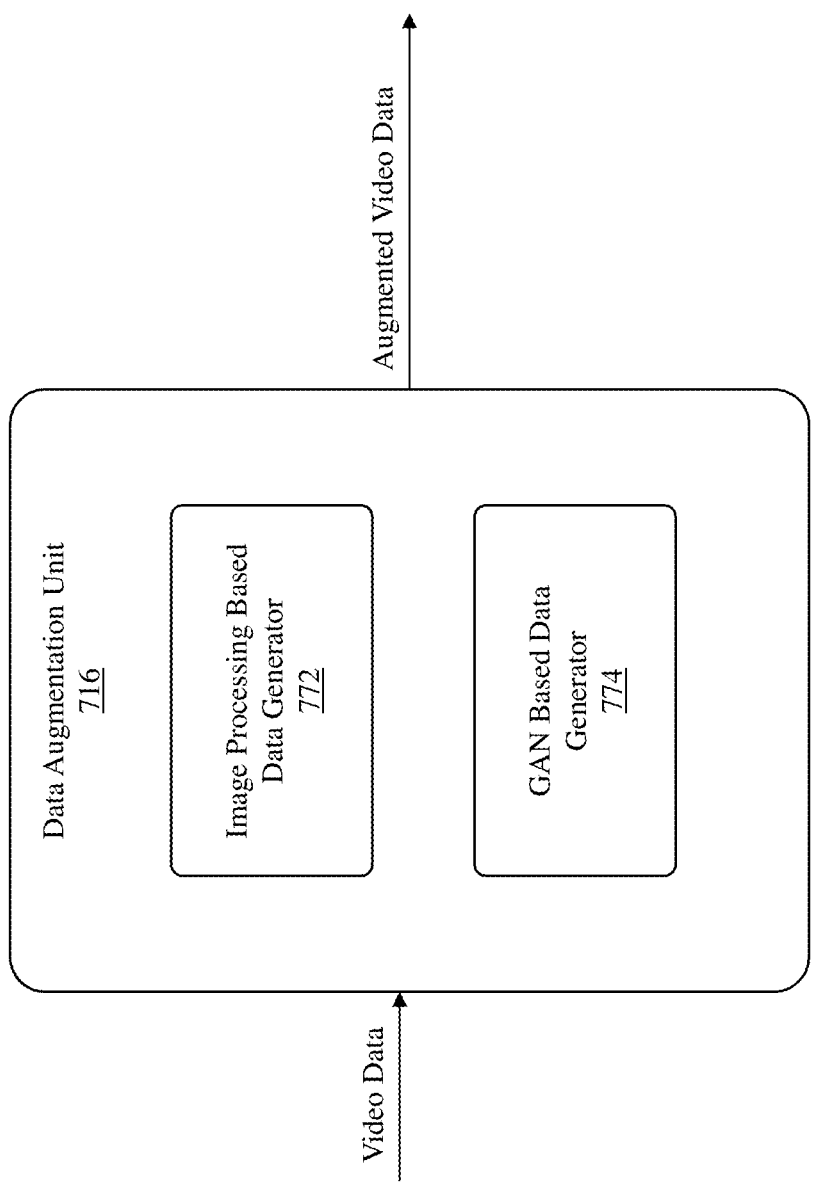
FIG. 7 depicts a data augmentation unit that can apply multiple data augmentation techniques to video data.

FIG. 7 depicts a data augmentation unit 716 that can apply multiple data augmentation techniques to video data. In the embodiment depicted in FIG. 7, the data augmentation unit 716 includes an image processing-based data generator 772 and a generative adversarial network (GAN)-based data generator 774. Applying multiple data augmentation techniques to video data can generate larger training video datasets and improve video quality prediction quality. Specifically, using both the image processing-based data generator 772 and the GAN-based data generator 774 to expand video data sets can generate video datasets in various quality levels and/or in different characteristics (e.g., different orientations, resolutions, or compression levels). Each of the image processing-based data generator 772 and the GAN-based data generator 774 may be implemented in software, hardware, firmware, and/or a combination of software, hardware, and/or firmware. The data augmentation unit 716 depicted in FIG. 7 is an embodiment of the data augmentation unit 216 depicted in FIG. 2. However, the data augmentation unit 216 depicted in FIG. 2 are not limited to the embodiment depicted in FIG. 7.

In the embodiment depicted in FIG. 7, the image processing-based data generator 772 is configured to perform image processing-based data augmentation on video data to generate training video data. Examples of image processing-based data augmentation techniques include, but not limited to, image flipping and image scoping. In some embodiments, the image processing-based data generator 772 is configured to receive an input video image in good quality and a quality indicator parameter identifying the quality of an output image to be produced from the input video image. In these embodiments, the image processing-based data generator 772 is configured to use an image compression method (e.g., JPEG compression) to convert the input video image to the output image that has the quality level identified by the quality indicator parameter.

In the embodiment depicted in FIG. 7, the GAN-based data generator 774 is configured to perform GAN-based data augmentation on video data to generate training video data. In some embodiments, the GAN-based data generator 774 first trains multiple image generation neural networks using a GAN, which includes at least one generator neural network and at least one discriminator neural network that operates against the generator neural network. In these embodiments, each image generation neural network converts a video image in good quality into a video image with a specific quality level. Subsequently, the GAN-based data generator 774 selects one of the image generation neural networks to generate video image in the specific quality level. The GAN-based data generator 774 may receive an input video image in good quality and a quality indicator parameter identifying the desired quality of an output image to be produced from the input video image and selects an image generation neural network associating with the quality level identified by the quality indicator parameter to convert the input image into the output image that has the quality level identified by the quality indicator parameter.

Turning back to the process flow diagram in FIG. 4, at block 408, a neural network is created and trained using data sets that are generated by data augmentation. In an embodiment, the neural network is a deep neural network or a deep learning network that includes at least one input layer, at least one hidden layer, and at least one output layer. In an embodiment, a deep neural network includes multiple layers of neural networks, which may include one or more rectified linear units (ReLUs) or other computing units. Compared to a traditional neural network that requires data extraction that needs human expertise to fine tune data features, a deep learning network does not require human expertise in fine tuning data features and can be implemented with lower costs. In some embodiments, multiple neural networks are created, each with an input layer receiving video images as an input and an output layer returning the quality level (e.g., good, average, bad, etc.) of the video images These neural networks may have different neural network architectures and/or different training parameters. In these embodiments, a trained neural network X 468 that provides best prediction on test datasets is selected from these neural networks.

Figure 8:
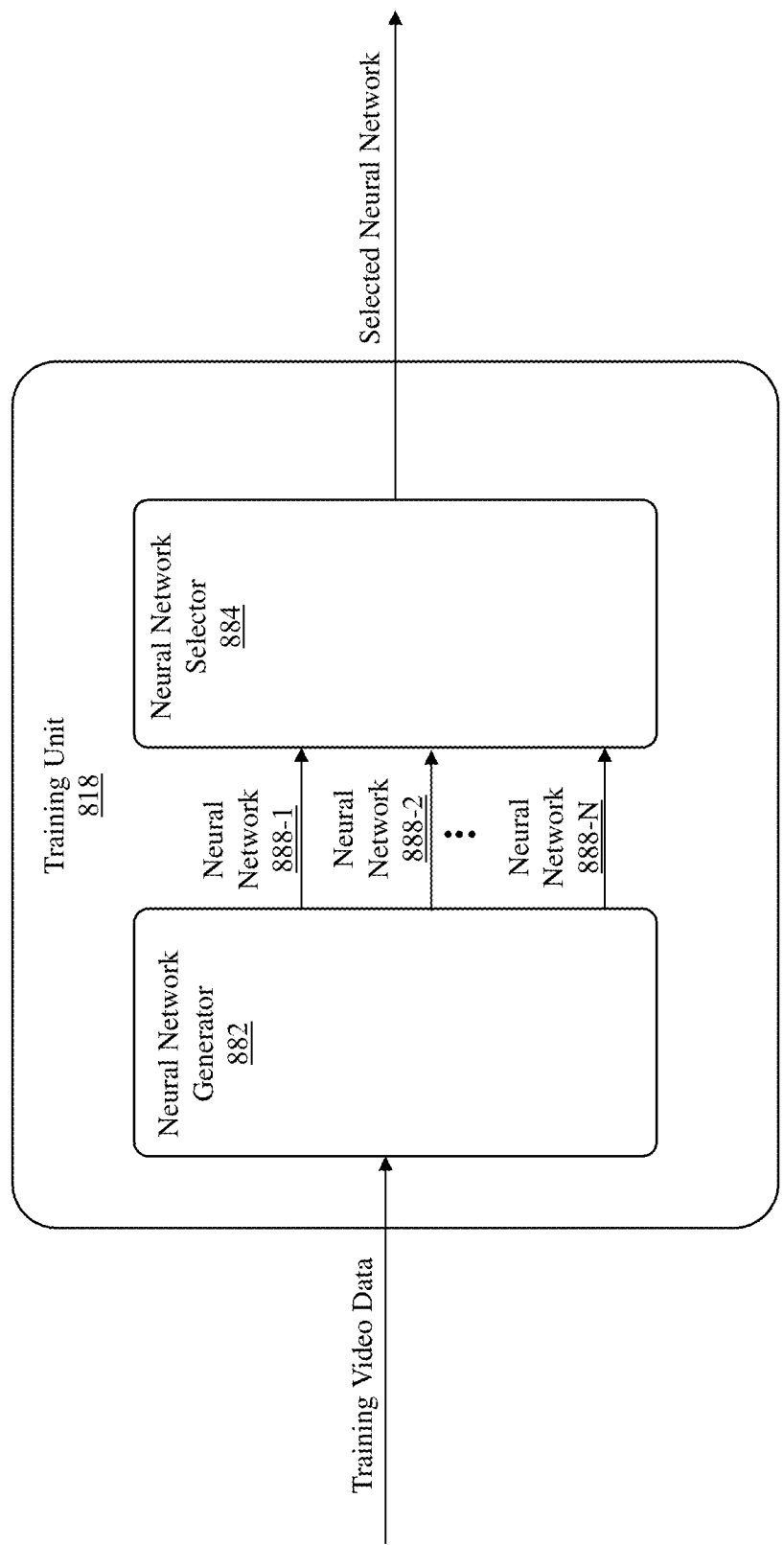
FIG. 8 depicts a training unit that can automatically generate a neural network to categorize input video images in various quality levels.

FIG. 8 depicts a training unit 818 that can automatically generate a neural network to categorize input video images in various quality level (e.g., as good, average or bad). In the embodiment depicted in FIG. 8, the training unit 818 includes a neural network generator 882 and a neural network selector 884. In some embodiments, the neural network generator 882 is configured to generate multiple neural networks, each with an input layer receiving video images as an input and an output layer returning the quality level of the video images (e.g., good, average, bad, etc.). These neural networks may have different neural network architectures and/or different training parameters. In these embodiments, the neural network selector 884 is configured to select one of the neural networks, which, for example, provides best prediction on test datasets. Compared to traditional machine learning-based video quality evaluation techniques that use fixed and predefined neural networks for video quality evaluation, selecting a high-performance neural network from a group of neural networks can reduce computation time and/or improve prediction accuracy. Each of the neural network generator 882 and the neural network selector 884 may be implemented in software, hardware, firmware, and/or a combination of software, hardware, and/ or firmware. The training unit 818 depicted in FIG. 8 is an embodiment of the training unit 218 depicted in FIG. 2. However, the training unit 218 depicted in FIG. 2 is not limited to the embodiment depicted in FIG. 8.

In some embodiments, the training unit 818 defines a list of convolution neural network (CNN) architectures, which inherit basic components of a baseline CNN such as MobileNet or Inception, but may vary in term of number of layers, layer size, and/or number of filters. In an embodiment, the list of CNNs is ordered based on the ascending number of multiply-accumulate (MAC) operations of the CNNs. For each CNN in this list, training and testing data is used to train the CNN until the CNN reaches an acceptable accuracy level. Once a CNN reaches an acceptable accuracy level, the training unit 818 stops and the trained CNN is used for video quality assessment. Otherwise, if the acceptable accuracy level does not reach after the training reach certain threshold (e.g., reaching the max number of epoch), the training unit 818 skips this CNN and picks up another CNN in the list to restart the training process.

Figure 9:
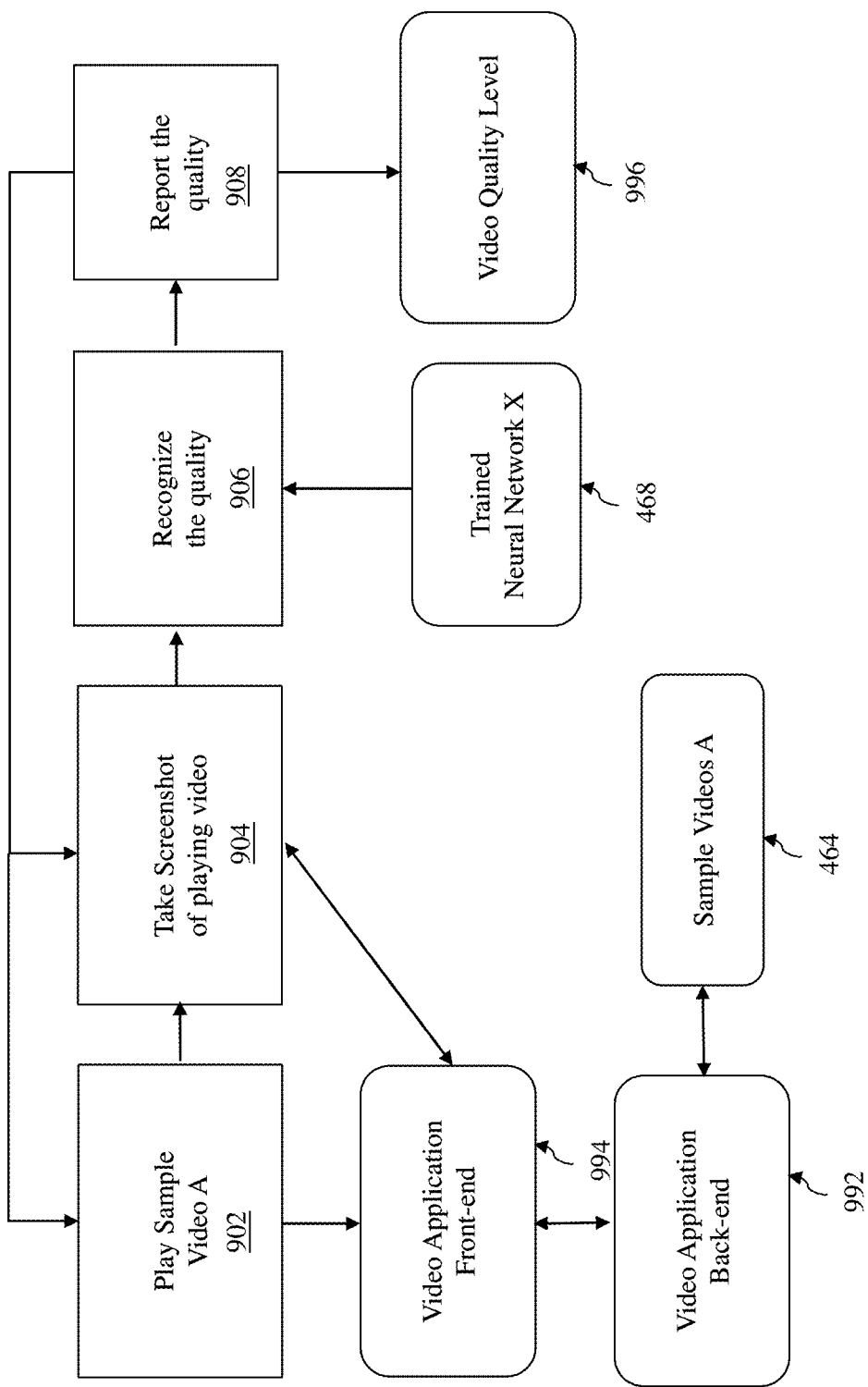
FIG. 9 is a process flow diagram of an operation of using a neural network to detect and monitor the quality of a video-based application in accordance with an embodiment of the invention.

FIG. 9 is a process flow diagram of an operation of using a neural network to detect and monitor the quality of a video-based application that can be executed by the video quality assessor 206 depicted in FIG. 2 in accordance with an embodiment of the invention. In the process flow diagram of FIG. 9, a performance agent may be installed at the front-end 994 of a video-based application, which may be a virtual device (e.g., a VM) or a physical device that simulates an end device. At block 902, the sample videos A 462 are played. For example, a video application back-end 992 of a video-based application (e.g., the video-based application 202) processes the video samples A 462 and the performance agent automatically plays the video samples A 462 from the video application front-end 994. At block 904, one or more screenshots are taken of the video samples A 462. For example, while the video samples A 462 are playing, the performance agent takes the screenshots and extracts the video content. At block 906, the quality of the extracted video content is recognized using the trained neural network X 468. For example, the performance agent uses the trained neural network X 468 to recognize the quality of video images. At block 908, the video quality level 996 is reported. For example, the performance agent reports the recognized video quality level 996 to a performance monitoring system (e.g., the cloud resource controller 108 depicted in FIG. 1) or output the results into files or databases. The process can be repeated until the video is completed playing. Compared to traditional methods for video quality assessment, using a neural network to detect and monitor the subjective quality of a video-based application can determine subjective video quality of video content with higher accuracy.

Figure 10:
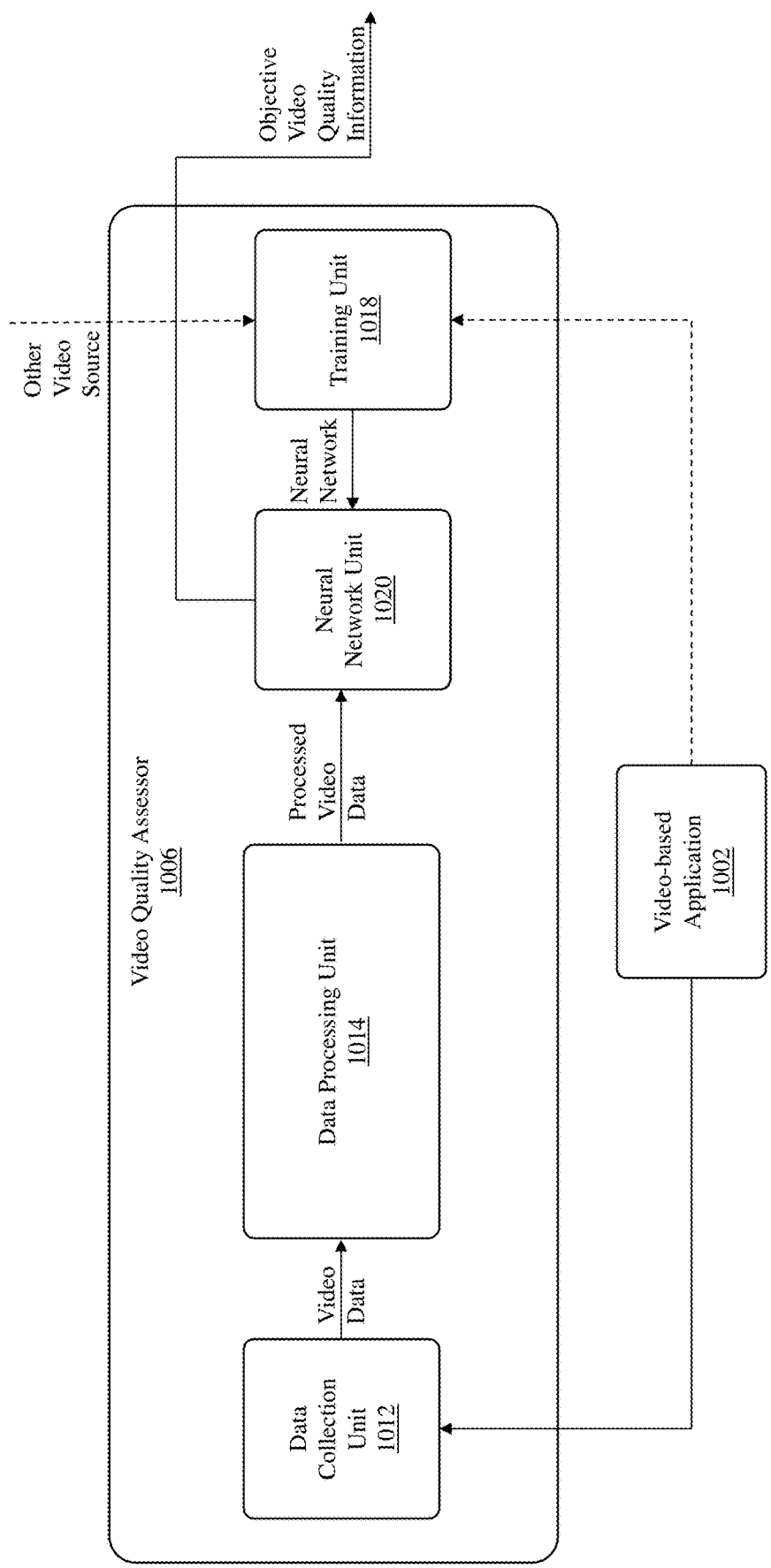
FIG. 10 depicts a video quality assessor that generates objective video quality information of a video-based application using machine learning.

FIG. 10 depicts a video quality assessor 1006 that generates objective video quality information of a video-based application 1002 using machine learning. In the embodiment depicted in FIG. 10, the video quality assessor 1006 includes a data collection unit 1012 that is configured to collect video data from the video-based application 1002, a data processing unit 1014 that is configured to process (e.g., extract and/or label) video data to generate processed video data, a training unit 1018 configured to train at least one neutral network (e.g., at least one deep neural network) based on video data from the video-based application 1002 and/or other video source (e.g., video-based application(s) or video database(s)), and a neutral network unit 1020 that is configured to generate the objective video quality information of the video-based application 202 using at least one neutral network (e.g., at least one deep neural network) based on the processed video data. Each of the data collection unit 1012, the data processing unit 1014, the training unit 1018, and the neutral network unit 1020 may be implemented in software, hardware, firmware, and/or a combination of software, hardware, and/or firmware. The video quality assessor 1006 depicted in FIG. 10 is an embodiment of the video quality assessor 106 depicted in FIG. 1 and the video-based application 1002 depicted in FIG. 10 is an embodiment of the video-based applications 102-1, 102-2, . . . , 102-N depicted in FIG. 1. However, the video quality assessor 106 and the video-based applications 102-1, 102-2, . . . , 102-N depicted in FIG. 1 are not limited to the embodiment depicted in FIG. 10.

In some embodiments, the video quality assessor 1006 generates a frame per second (FPS) metric of the video-based application 1002 using machine learning. In an embodiment, the FPS metric is an end-to-end performance metric that counts how many frames per second an end user can see from the application front-end of the video-based application 1002. The FPS metric is an objective metric that is used to estimate user experience of the video-based application 1002 (e.g., a video streaming app). The video quality assessor 1006 focuses on the FPS captured at a client device (e.g., front-end performance). Generating FPS-based objective video quality metric of the video-based application 1002 is different from typical FPS-based video encoding/decoding approaches that mainly gauge the video processing power of a video-based application or the software/hardware infrastructure running the video-based application (e.g., back-end performance). For example, a video-based application can use a GPU to decode video content at a datacenter at 60 FPS and then stream this video content to a client device. However, because of the limitations of network bandwidth and computing power of the client device, the FPS of the video content displayed at the client device can be much lower (e.g. 24 FPS).

A previous solution for measuring video FPS is watermarking, which uses watermark to label video frames and to compute a video FPS metric using regular image processing techniques. However, when the delivered video content is low quality (for example, noise or blurry video images), the reliability of this method reduces significantly because the results of traditional image-processing techniques are heavily impacted by the input image quality. Instead of using watermarking, the video quality assessor 1006 can label a video frame with a frame ID in text content. A performance monitor agent at the front-end (e.g., a display client or a view client) of the video-based application 1002 can capture and read the frame IDs using the text recognition technology to read the frame IDs and compute FPS based on the number of recognized frames. This approach works better than the watermarking technology when the video content is low quality at the front-end of the video-based application 1002 because the text recognition technology is based on finding patterns in a video image, rather than counting image pixels as in watermarking method. In addition, using the text content for labeling video frame can make debugging performance issue easier because the text is readable for humans.

In some embodiments, the video quality assessor 1006 operates in three stages. In a first stage, the video quality assessor 1006 generates video data and train a text recognition neural network. In a second stage, the video quality assessor 1006 uses the text recognition neural network to obtain video FPS metrics of the video-based application 1002. In a third stage, the video quality assessor 1006 measures objective video quality based on the video FPS metrics of the video-based application 1002. Compared to traditional watermark-based FPS methods for video quality assessment, the video quality assessor 1006 depicted in FIG. 10 can determine objective video quality of video content with higher accuracy, even for low-quality video content.

Figure 11:
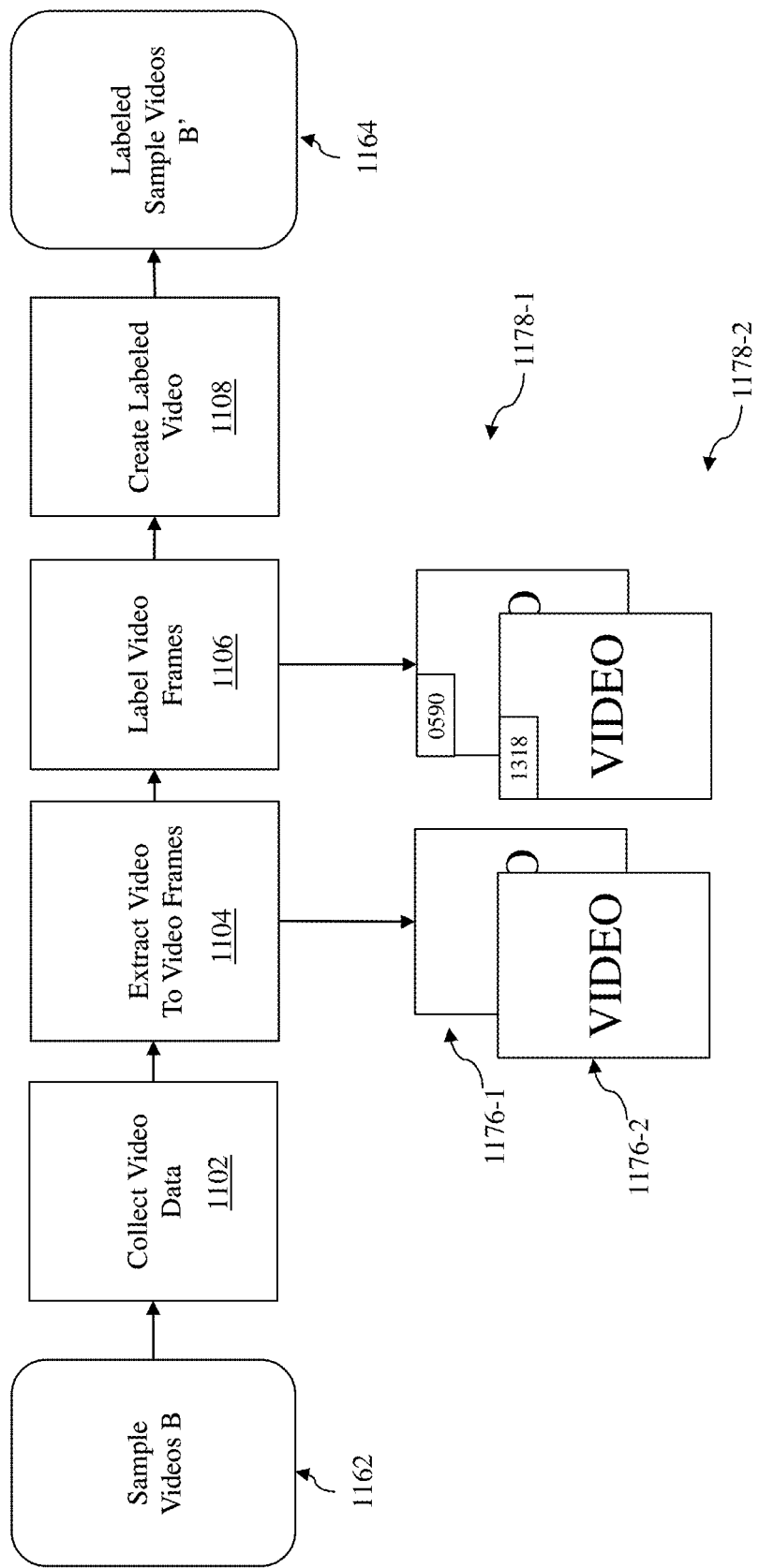
FIG. 11 is a process flow diagram of an operation for generating video data that can be executed by the video quality assessor depicted in FIG. 10 in accordance with an embodiment of the invention.

FIG. 11 is a process flow diagram of an operation for generating video data that can be executed by the video quality assessor 1006 depicted in FIG. 10 in accordance with an embodiment of the invention. In the process flow diagram of FIG. 11, the video quality assessor 1006 processes a sample video B 1162 to generate a labeled sample video B' 1164 that can be used to calculate video FPS metrics. The operation begins with block 1102, where video data is collected from the video-based application 1102, for example, by the data collection unit 1012 depicted in FIG. 10. In some embodiments, multiple sample videos with a content of interest, which are referred as sample videos B 1162, are collected, for example, by the data collection unit 1012 depicted in FIG. 10. At block 1104, video data (e.g., the sample videos B 1162) is extracted into video frames (e.g., video frames 1176-1, 1176-2). At block 1106, each video frame is labeled, for example, with a frame identification number (ID) in text. Editing video frames to insert video frame IDs can be done by either a video-based application that generates the video frames or a separate video editing tool. If a separate video editing tool is used, the video data can be used for quality assessment in multiple video-based applications without modifying the video-based applications. In some embodiments, the frame ID includes a Start ID and an End ID to mark the starting and ending points for frame counting. For example, the video frames 1166-1, 1166-2 can be labeled with labels StartV, 0001, 00002, . . . , EndV (e.g., frame IDs 0590, 1318) at the top left corner of video content to generate labeled video frames 1178-1, 1178-2. At block 1108, labeled sample video B' 1164 are generated from the labeled frames.

Figure 12:
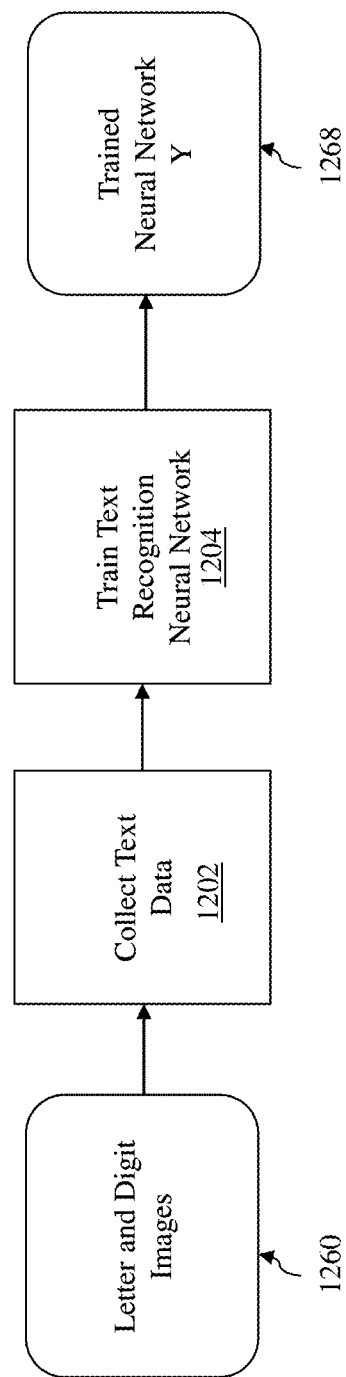
FIG. 12 is a process flow diagram of an operation for training a frame recognition neural network that can be executed by the video quality assessor depicted in FIG. 10 in accordance with an embodiment of the invention.

FIG. 12 is a process flow diagram of an operation for training a frame recognition neural network that can be executed by the video quality assessor 1006 depicted in FIG. 10 in accordance with an embodiment of the invention. In the process flow diagram of FIG. 12, the video quality assessor 1006 creates the frame recognition neural network that can recognize text content in video frames using letter and digit images 1260. The operation begins with block 1202, where training data (e.g., the letter and digit images 1260) is collected for example, from public resources, and divided into training and testing datasets. At block 1204, a text recognition neural network Y 1268 is trained using the training data. In some embodiments, multiple candidate text recognition neural networks are trained, each with an input layer receiving video images as an input and an output layer outputting the prediction of what letters and/or digits shown in the video images. These candidate neural networks may have different neural network architectures and different training parameters. In these embodiments, a trained text recognition neural network Y 1268 that provides best prediction on test datasets is selected from these candidate text recognition neural networks.

Figure 13:
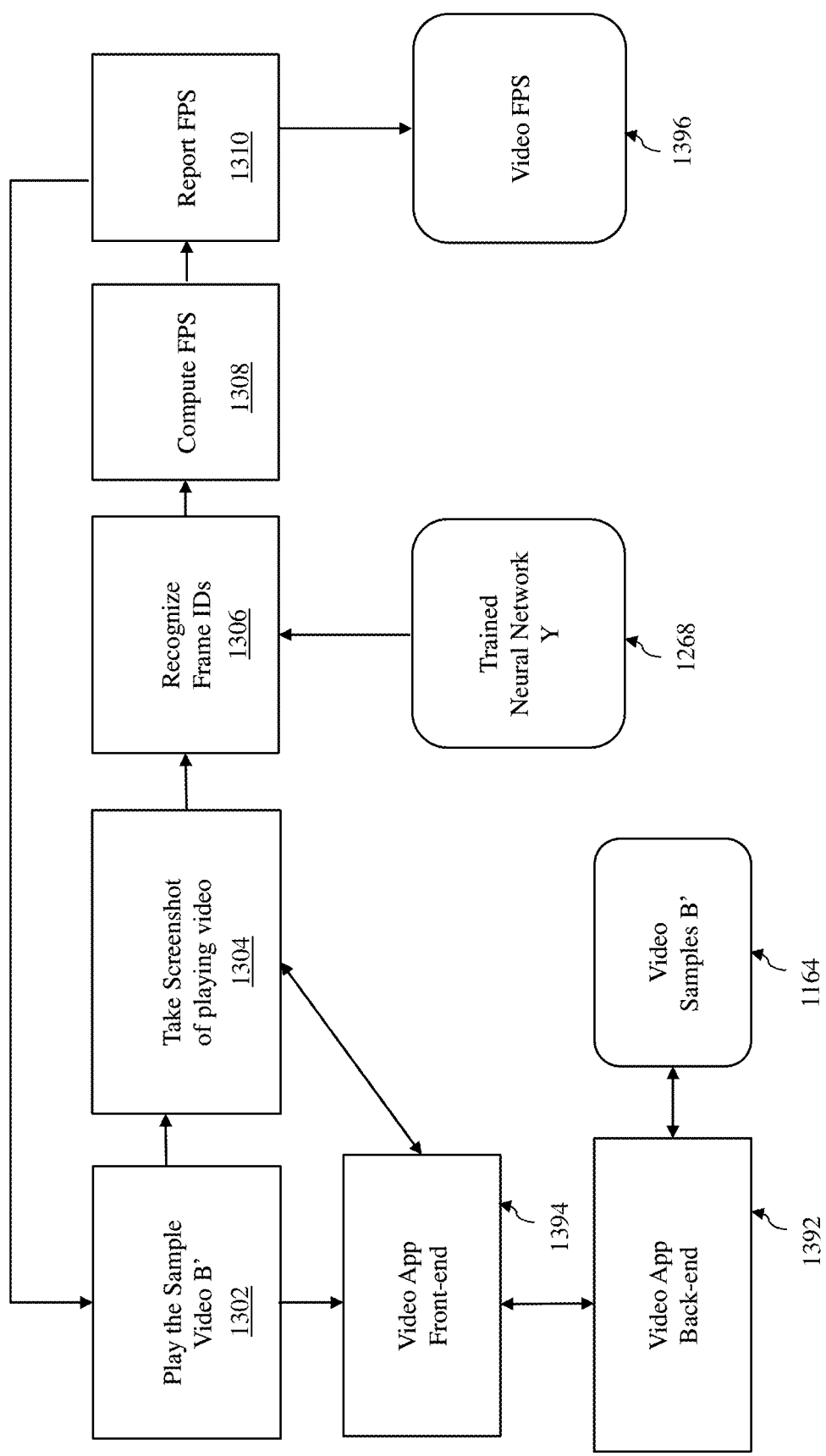
FIG. 13 is a process flow diagram of an operation of using a frame recognition neural network to measuring video FPS metrics that can be executed by the video quality assessor depicted in FIG. 10 in accordance with an embodiment of the invention.

FIG. 13 is a process flow diagram of an operation of using a frame recognition neural network to measuring video FPS metrics that can be executed by the video quality assessor 1006 depicted in FIG. 10 in accordance with an embodiment of the invention. In the process flow diagram of FIG. 13, a performance agent may be installed at the front-end 1394 of a video-based application (e.g., the video-based application 1002), which may be a virtual device (e.g., a VM) or a physical device that simulates an end device. At block 1002, the labeled sample video B' 1164 are played. For example, a video application back-end 1392 of a video-based application (e.g., the video-based application 1002) processes the video samples B' 1164 and the performance agent automatically plays the video samples B' 1164 from the video application front-end 1394. At block 1304, one or more screenshots are taken of the video samples B' 1164 and corresponding timestamps are recorded. The performance agent can scope the screenshots to obtain the region with frame ID (e.g., top-left corner as in frames 1178-1, 1178-2 or any other position with a data frame) and save the scoped images with corresponding timestamp into files. At block 1306, frame IDs are recognized using the trained neural network Y 1268. At block 1308, video FPS metrics are computed based on recognized frame IDs. In some embodiments, the number of frames with unique IDs that appear from the beginning frame to the ending frame are counted. Video playing time can be calculated as the difference between the timestamp of the ending frame and the timestamp of the starting frame and the FPS is calculated as the ratio between the number of the video frames and the video playing time. At block 1310, the video FPS 1396 is reported. For example, the performance agent reports the recognized video FPS 1396 to a performance monitoring system (e.g., the cloud resource controller 108 depicted in FIG. 1) or output the results into files or databases. The process can be repeated until the video is completed playing. Compared to watermark-based methods for FPS assessment, inserting frame IDs into video content and recognizing the frame IDs using a neural network can determine FPS of video content with higher accuracy.

Figure 14:
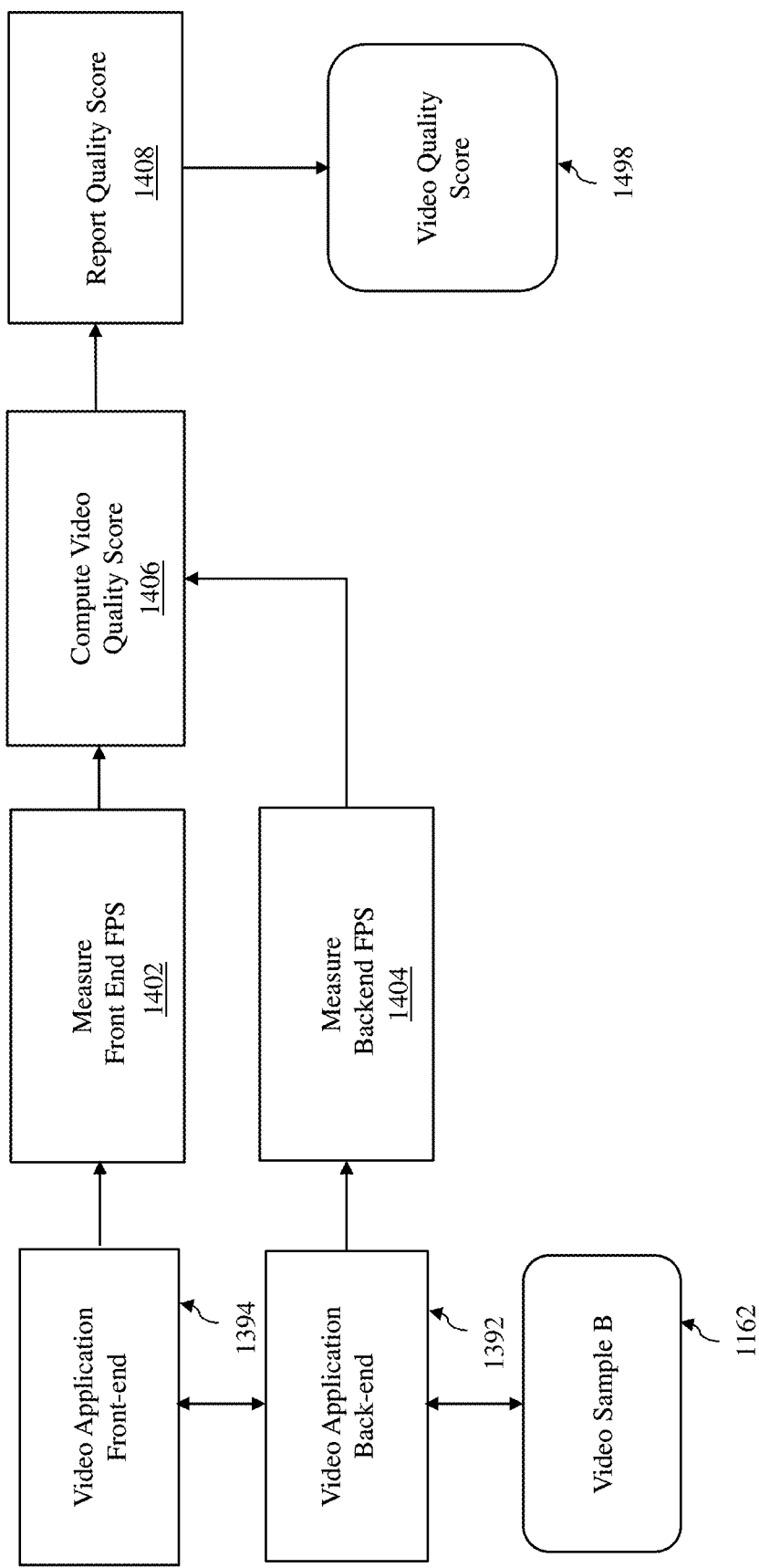
FIG. 14 is a process flow diagram of an operation of measuring an objective video quality score that can be executed by the video quality assessor depicted in FIG. 10 in accordance with an embodiment of the invention.

FIG. 14 is a process flow diagram of an operation of measuring an objective video quality score that can be executed by the video quality assessor 1006 depicted in FIG. 10 in accordance with an embodiment of the invention. In the process flow diagram of FIG. 14, a performance agent is installed at the front-end 1394 of a video-based application (e.g., the video-based application 1002), which may be a virtual device (e.g., a VM) or a physical device that simulates an end device. At block 1402, a front-end FPS (e.g., frame per second at a view client or a display) is measured. At block 1404, a back-end FPS (e.g., frame per second at a video decoder or a processor) is measured. In some embodiments, the video application back-end 1392 may provide an interface for FPS capturing. For example, in VMware® Horizon View™ platform, before video content is delivered to a view client software at an end user device, the video content is decoded and displayed at the display of a remote desktop at the corresponding datacenter, from which the back-end FPS of the video content can be calculated. At block 1406, a video quality score is computed based on the front-end FPS and the back-end FPS. In some embodiments, the video quality score is computed as a ratio between the front-end FPS and the back-end FPS. At block 1408, the video quality score 1498 is reported. For example, the performance agent reports the video quality score 1498 to a performance monitoring system (e.g., the cloud resource controller 108 depicted in FIG. 1) or output the results into files or databases. Compared to video quality assessment based on standard front-end or back-end FPS metrics, examining a video quality score computed based on the front-end FPS and the back-end FPS can determine objective quality of video content with higher accuracy.

Figure 15:
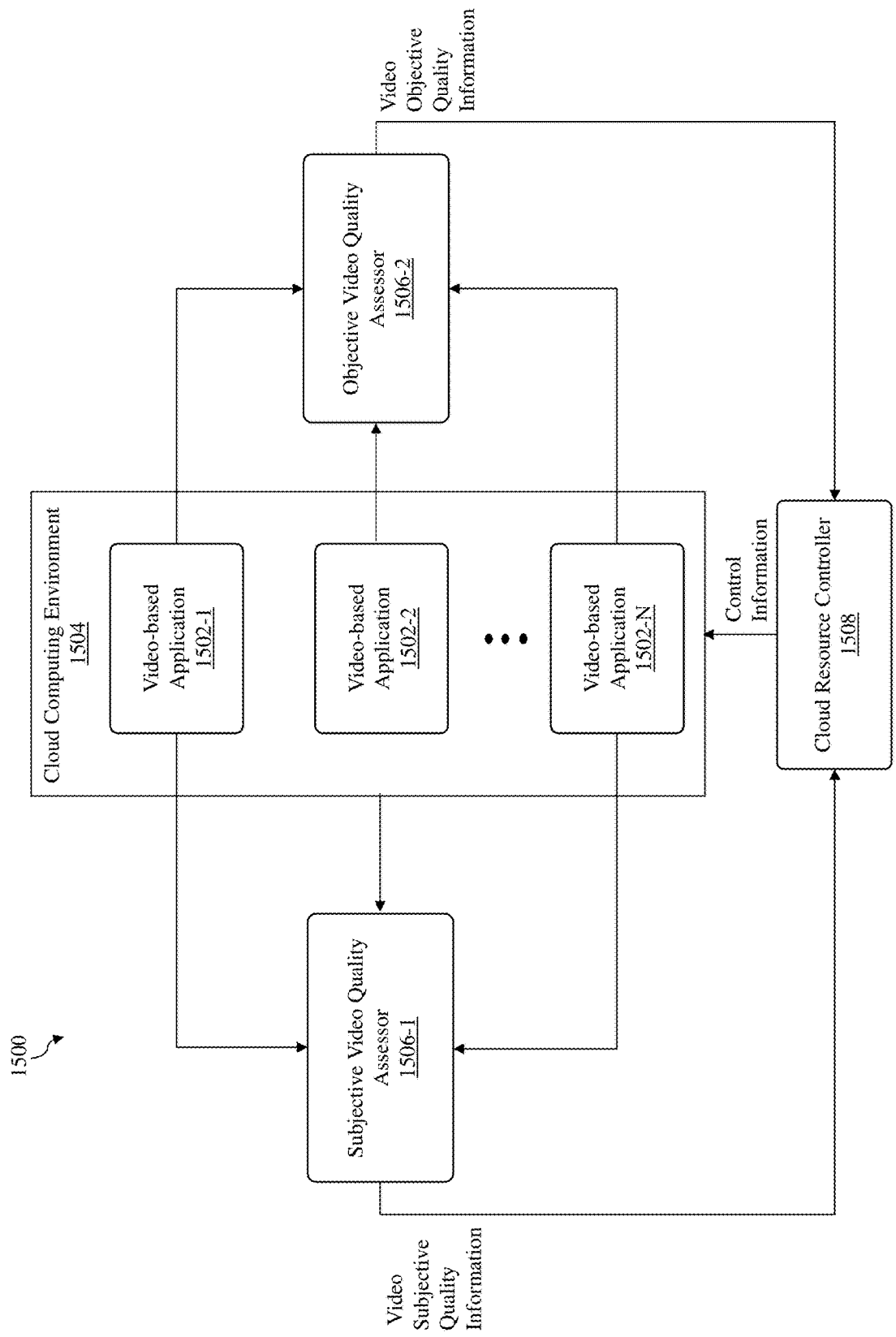
FIG. 15 shows a video application system that assesses both subjective video quality and objective video quality in accordance with an embodiment of the invention.

FIG. 15 shows a video application system 1500 that assesses both subjective video quality and objective video quality in accordance with an embodiment of the invention. The video application system 1500 includes one or more video-based applications 1502-1, 1502-2, ..., 1502-N, where N is a positive integer, a subjective video quality assessor 1506-1, an objective video quality assessor 1506-2, and at least one cloud resource controller 1508. The video-based applications 1502-1, 1502-2, ..., 1502-N may include at least one video streaming application, such as YouTube, Zoom, Skype, or VMware Horizon® application that plays video content. In some embodiments, the video-based applications 1502-1, 1502-2, ..., 1502-N execute within a cloud computing environment 1504, which may include one or more networks or clouds. In some embodiments, the cloud computing environment includes computing and/or storage infrastructures to support the video-based applications 1502-1, 1502-2, ..., 1502-N, the video quality assessors 1506-1, 1506-2, and/or the cloud resource controller 1508. In some embodiments, the subjective video quality assessor 1506-1 is configured to assess the subjective quality of at least one of the video-based applications 1502-1, 1502-2, ..., 1502-N to generate subjective video quality information and the objective video quality assessor 1506-2 is configured to assess the objective quality of at least one of the video-based applications 1502-1, 1502-2, ..., 1502-N to generate objective video quality information. The subjective video quality information and the objective video quality information can be used by the cloud resource controller 1508 to optimize cloud resources for the video-based applications 102-1, 102-2, ..., 102-N. In some embodiments, the cloud resource controller 1508 is configured to control cloud resources, which may include computing, storage and/or networking resources, in response to the subjective video quality information and the objective video quality information, for example, to improve video quality or maintain a particular video quality (e.g., adequate video quality suitable for video streaming) In some embodiments, based on the subjective video and objective quality information, the cloud resource controller 1058 is configured to optimize cloud resources for the video-based applications 1502-1, 1502-2, ..., 1502-N to enhance user experiences or maintain best user experiences. In an embodiment, based on the subjective video and objective quality information, the cloud resource controller 1508 improves network condition within the cloud computing environment 1504 and/or increases computing and/or storage resource capacity and/or resource allocation to a particular video-based application 1502-1, 1502-2, ..., or 1502-N. For example, based on the video quality information of a particular video-based application 1502-1, 1502-2, ..., or 1502-N, the cloud resource controller 1508 may increase bandwidth allocation, processing capability allocation, and/or storage allocation to a particular video-based application 1502-1, 1502-2, ..., or 1502-N.

Figure 16:
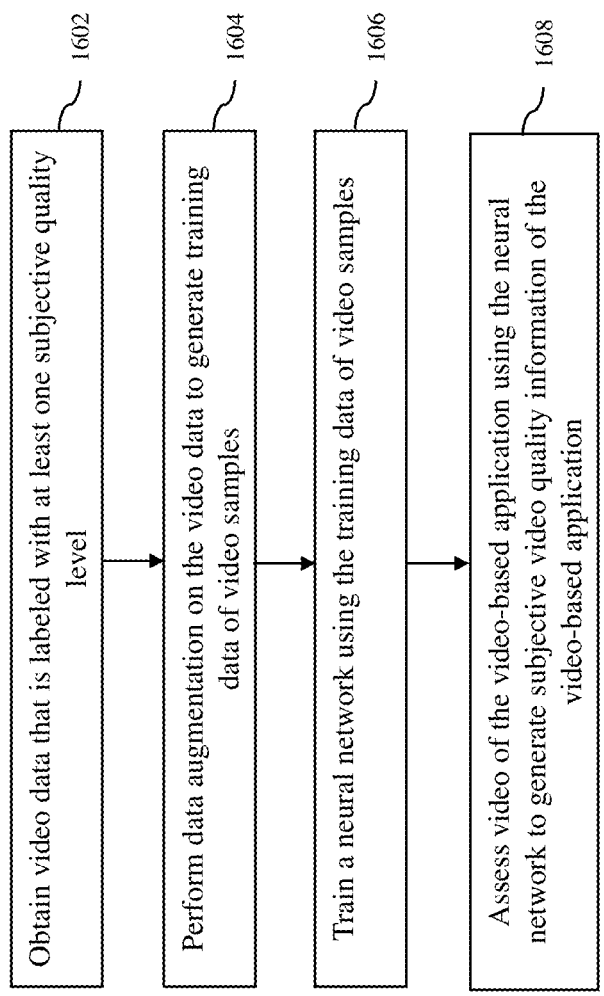
FIG. 16 depicts a flow diagram of a computer-implemented method for assessing video quality of a video-based application in accordance with an embodiment of the invention.

A computer-implemented method for assessing video quality of a video-based application in accordance with an embodiment of the invention is described with reference to a flow diagram of FIG. 16. At block 1602, video data is obtained, where the video data is labeled with at least one subjective quality level. At block 1604, data augmentation is performed on the video data to generate training data of video samples. At block 1606, a neural network is trained using the training data of video samples. At block 1608, video of the video-based application is assessed using the neural network to generate subjective video quality information of the video-based application.

Figure 17:
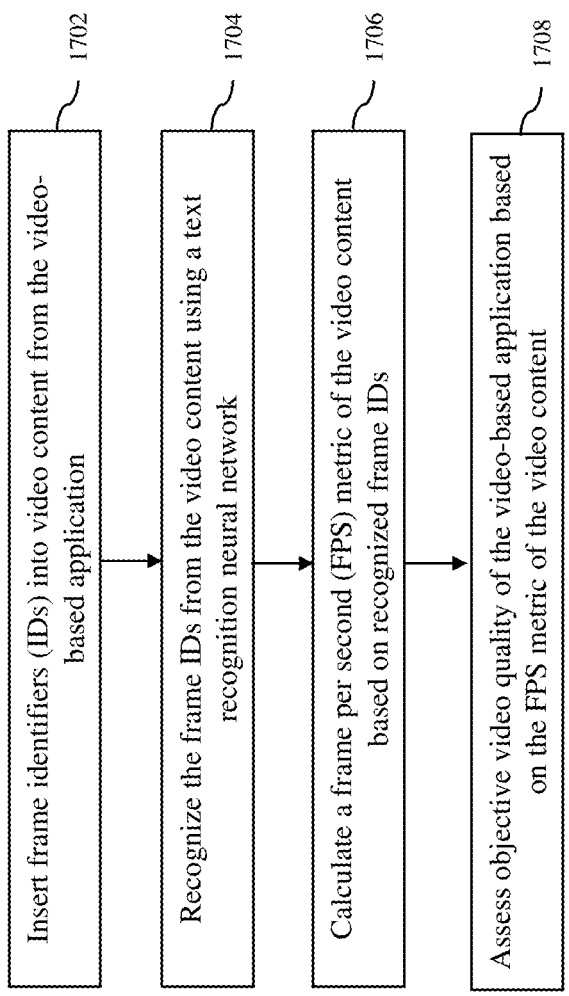
FIG. 17 depicts a flow diagram of a computer-implemented method for assessing video quality of a video-based application in accordance with another embodiment of the invention.

A computer-implemented method for assessing video quality of a video-based application in accordance with another embodiment of the invention is described with reference to a flow diagram of FIG. 17. At block 1702, frame identifiers (IDs) are inserted into video content from the video-based application. At block 1704, the frame IDs are recognized from the video content using a text recognition neural network. At block 1706, a frame per second (FPS) metric of the video content is calculated based on recognized frame IDs. At block 1708, objective video quality of the video-based application is assessed based on the FPS metric of the video content.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for assessing video quality of a video-based application, the method comprising:
   inserting a plurality of frame identifiers (IDs) into video content from the video-based application;
   recognizing the frame IDs from the video content using a text recognition neural network;
   calculating a front-end frame per second (FPS) metric and a back-end FPS metric of the video content based on recognized frame IDs; and
   assessing objective video quality of the video-based application based on the front-end and back-end FPS metrics of the video content.

2. The method of claim 1, wherein assessing the objective video quality of the video-based application based on the front-end and back-end FPS metrics of the video content comprises computing a video quality score as a ratio between the front-end FPS metric and the back-end FPS metric.

3. The method of claim 1, wherein inserting the frame IDs into the video content from the video-based application comprises:
   extracting the video content into a plurality of video frames;
   labeling each of the video frames with one of the frame IDs as text; and
   creating labeled video content from the labeled video frames.

4. The method of claim 3, further comprising taking a plurality of screen shots of the labeled video content with a plurality of corresponding timestamps, wherein recognizing the frame IDs from the video content using the text recognition neural network comprises recognizing the frame IDs from the screen shots.

5. The method of claim 4, wherein calculating the front-end FPS metric and the back-end FPS metric of the video content based on the recognized frame IDs comprises calculating at least one of the front-end FPS metric and the back-end FPS metric of the video content based on the recognized frame IDs and the corresponding timestamps.

6. The method of claim 1, wherein the text recognition neural network comprises a deep neural network.

7. The method of claim 1, wherein assessing the objective video quality of the video-based application based on the front-end and back-end FPS metrics of the video content comprises computing a video quality score based on the front-end and back-end FPS metrics of the video content.

8. The method of claim 1, further comprising assessing the video-based application using a second neural network to generate subjective video quality information of the video-based application.

9. A non-transitory computer-readable storage medium containing program instructions for method for assessing video quality of a video-based application, wherein execution of the program instructions by one or more processors of a computer causes the one or more processors to perform steps comprising:
- inserting a plurality of frame identifiers (IDs) into video content from the video-based application;
- recognizing the frame IDs from the video content using a text recognition neural network;
- calculating a front-end frame per second (FPS) metric and a back-end FPS metric of the video content based on recognized frame IDs; and
- assessing objective video quality of the video-based application based on the front-end and back-end FPS metrics of the video content.

10. The non-transitory computer-readable storage medium of claim 9, wherein assessing the objective video quality of the video-based application based on the front-end and back-end FPS metrics of the video content comprises computing a video quality score as a ratio between the front-end FPS metric and the back-end FPS metric.

11. The non-transitory computer-readable storage medium of claim 9, wherein inserting the frame IDs into the video content from the video-based application comprises:
- extracting the video content into a plurality of video frames;
- labeling each of the video frames with one of the frame IDs as text; and
- creating labeled video content from the labeled video frames.

12. The non-transitory computer-readable storage medium of claim 11, wherein the step further comprise taking a plurality of screen shots of the labeled video content with a plurality of corresponding timestamps, wherein recognizing the frame IDs from the video content using the text recognition neural network comprises recognizing the frame ID s from the screen shots.

13. The non-transitory computer-readable storage medium of claim 12, wherein calculating the front-end FPS metric and the back-end FPS metric of the video content based on the recognized frame IDs comprises calculating at least one of the front-end FPS metric and the back-end FPS metric of the video content based on the recognized frame IDs and the corresponding timestamps.

14. The non-transitory computer-readable storage medium of claim 9, wherein the text recognition neural network comprises a deep neural network.

15. The non-transitory computer-readable storage medium of claim 9, wherein assessing the objective video quality of the video-based application based on the front-end and back-end FPS metrics of the video content comprises computing a video quality score based on the front-end and back-end FPS metrics of the video content.

16. A system for assessing video quality of a video-based application comprising:
- memory; and
- at least one processor configured to:
  - insert a plurality of frame identifiers (IDs) into video content from the video-based application;
  - recognize the frame IDs from the video content using a text recognition neural network;
  - calculate a front-end frame per second (FPS) metric and a back-end FPS metric of the video content based on recognized frame IDs; and
  - assess objective video quality of the video-based application based on the front-end and back-end FPS metrics of the video content.

17. The system of claim 16, wherein the at least one processor is further configured to compute a video quality score as a ratio between the front-end FPS metric and the back-end FPS metric to assess the objective video quality of the video-based application.

18. The system of claim 16, wherein the at least one processor is configured to:
- extract the video content into a plurality of video frames;
- label each of the video frames with one of the frame IDs as text; and
- create labeled video content from the labeled video frames.

19. The system of claim 18, wherein the at least one processor is configured to take a plurality of screen shots of the labeled video content with a plurality of corresponding timestamps, wherein the screen shots are used to recognize the frame IDs from the video content using a text recognition neural network.

20. The system of claim 19, wherein the at least one processor is configured to calculate at least one of the front-end FPS metric and the back-end FPS metric of the video content based on the recognized frame IDs and the corresponding timestamps.

* * * * *